United States Patent
Kahlman et al.

[11] Patent Number: 5,825,740
[45] Date of Patent: Oct. 20, 1998

[54] DEVICE FOR SCANNING INFORMATION TRACKS ON A RECORD CARRIER

[75] Inventors: Josephus A. H. M. Kahlman; Gerard E. Van Rosmalen, both of Eindhoven, Netherlands

[73] Assignee: U.S. Philips Corporation, New York, N.Y.

[21] Appl. No.: 888,143

[22] Filed: Jul. 3, 1997

[30] Foreign Application Priority Data

Jul. 3, 1996 [EP] European Pat. Off. ........... 96201816.4
Oct. 30, 1996 [EP] European Pat. Off. ........... 96203030.0

[51] Int. Cl.⁶ ....................................................... G11B 7/00
[52] U.S. Cl. .................... 369/97; 369/44.27; 369/44.32; 369/44.18
[58] Field of Search .................................. 369/97, 96, 93, 369/54, 58, 47, 44.11, 44.17, 44.18, 44.19, 44.28, 44.32

[56] References Cited

U.S. PATENT DOCUMENTS 5,465,241 11/1995 Narahara ................................ 369/97 X
5,673,245 9/1997 Yanagawa et al. .................... 369/97 X

FOREIGN PATENT DOCUMENTS

0229395B1 3/1992 European Pat. Off. .

*Primary Examiner*—Muhammad N. Edun
*Attorney, Agent, or Firm*—Michael E. Belk

[57] ABSTRACT

A device for electromagnetically scanning information tracks on a record carrier, such as an optical tape, via a scanning beam is described. On this tape, information tracks are arranged substantially parallel and substantially transverse to a transport direction of the record carrier. The device is provided with a scanning unit for scanning, with the beam always following parallel scanning paths, and a control system for controlling an angle of the scanning paths with respect to the transport direction, dependent on a tilt signal. According to the invention, the device is provided with angle-measuring means for generating the tilt signal dependent on a tracking error signal which is indicative of a difference between a scanning path and the relevant information track. In addition to a tilt signal, a speed signal may also be derived from the tracking error signal. Both the tilt signal and the speed signal are derived from the tracking error signal in a captured and in a non-captured state of operation.

10 Claims, 10 Drawing Sheets

FIG. 14

DEVICE FOR SCANNING INFORMATION TRACKS ON A RECORD CARRIER

FIELD OF THE INVENTION

The invention relates to the field of electromagnetic storage and retrieval of data and more specifically to electromagnetically scanning information tracks on a record carrier.

BACKGROUND OF THE INVENTION

Such a device for scanning information tracks is known from Patent Specification EP 0 229 395 hereby incorporated herein in whole by reference. The known device is suitable for recording and reproducing information and, to this end, it is provided with means for optically scanning information tracks on a tape-shaped record carrier, which is transported in a transport direction corresponding to the longitudinal direction of the tape with respect to the scanning unit. The information tracks are arranged at a predetermined angle transverse to the longitudinal direction of the record carrier. The device is provided with an optical system for projecting a scanning spot on the record carrier and for imaging this spot on a detector to regain the information. The optical system comprises a rotatable mirror polygon for displacing the scanning spot along parallel scanning paths. The scanning paths, which are constituted by the trajectory covered by the scanning spot across the surface of the record carrier, have an angle with respect to the transport direction of the record carrier, which angle is determined by an angle position of the scanning unit, the transport speed of the record carrier and the displacement speed of the scanning spot. When information tracks are scanned, the angle of the scanning paths should be mainly equal to the angle of the information tracks. The angle position of the scanning unit is adjustable by tilting the polygon along an axis transverse to the axis of rotation via actuators which are driven by a tilt signal. The tilt signal is derived from the transport speed of the record carrier, so that at different transport speeds and a predetermined rotational speed of the polygon the angle of the scanning paths is mainly equal to the angle of the information tracks.

A problem in the known device is that the angle position of the scanning unit must be accurately adjusted to render a reliable scanning at a desired angle possible. The device is sensitive, inter alia, to inaccuracies of the transport of the record carrier, mechanical disturbances and temperature differences. This is particularly a problem when the same record carrier is used in different devices.

The above citations are hereby incorporated in whole by reference.

SUMMARY OF THE INVENTION

It is an object of the invention to provide a device for scanning information tracks on a record carrier, which is less sensitive to disturbances. According to the invention, the device is therefore characterized in that the device is provided with angle-measuring means for generating the tilt signal dependent on a tracking error signal which is indicative of a difference between a scanning path and the relevant information track. Consequently, the difference between the scanning path and the relevant information track will be limited as much as possible. This has, inter alia, the advantage that different record carriers can be scanned at a constant quality and without correcting the adjustment of the device. When there are inaccuracies in the transport of the record carrier, the actual angle of the information tracks will vary with the global transport direction due to unwanted movements of the record carrier, such as tilts of a tape-shaped record carrier. By using the tilt signal according to the invention, the actual difference is limited, independently of the unwanted movements of the record carrier. This has the advantage that a simple transport mechanism can be used, which also renders very fast winding possible without excess wear of the record carrier.

An embodiment of the device according to the invention is characterized in that the angle-measuring means are adapted to generate the tilt signal dependent on a change of the tracking error signal when an information track is being scanned. This has the advantage that the angle error, namely the angle between the scanning path and the relevant information track, is simply apparent from this change.

A further embodiment of the device according to the invention is characterized in that the angle-measuring means are adapted to generate the tilt signal dependent on a difference between an integrated value of the tracking error signal when a first part and a second part of the relevant information track are being scanned. This has the advantage that the difference throughout the length of the information track contributes to the tilt signal. Moreover, the tilt signal is insensitive to a displacement of the scanning path in the transport direction.

A further embodiment of the device according to the invention is characterized in that the angle-measuring means are adapted to generate the tilt signal dependent on the tracking error signal and a tracking loss signal which is indicative of a relation between the tracking error signal and the distance between the scanning path and the relevant information track. In an operating state, in which a part of the scanning path is relatively far remote from the relevant information track, the relation between this part of the tracking error signal and the distance is disturbed, for example, inverted. The tracking loss signal indicates that the relation of the tracking error signal is no longer valid and that the tracking error signal cannot be used or must be, for example, inverted. The combination of the tracking error signal and the tracking loss signal has the advantage that the tilt signal is also a satisfactory measure of the angle error in said operating state.

A further embodiment of the device according to the invention is characterized in that the angle-measuring means are adapted to generate the tilt signal dependent on the location of the points of intersection of the scanning path with different information tracks. This has the advantage that a reliable tilt signal can be generated in an operating state in which the scanning path has a large angle error, while more than one information track is intersected, and such intersections are easily recognizable in the tracking error signal, for example, by a zero crossing.

A further embodiment of the device according to the invention is characterized in that the device is provided with speed-measuring means for generating a speed signal which is indicative of the transport speed dependent on the tracking error signal. The speed signal is an indication of the relative transport speed of the record carrier with respect to the scanning unit, which scanning unit may have an instantaneous speed with respect to the device. This has the advantage that the transport speed can be controlled in dependence on the speed signal, so that a displacement of the scanning path in the transport direction is realized in such a way that the scanning path coincides as much as possible with the relevant information track.

A further embodiment of the device according to the invention is characterized in that the speed-measuring means are adapted to generate the speed signal dependent on an integrated value of the tracking error signal when the relevant information track is being scanned. The speed can then be determined as a derivative of the displacement which is determined, per scanning path, from the integrated value. This has the advantage that the tracking error signal contributes to the speed signal throughout the length of the information track.

A further embodiment of the device according to the invention is characterized in that the speed-measuring means are adapted to generate the speed signal dependent on the location of corresponding points of intersection of different scanning paths with information tracks. This has the advantage that a reliable speed signal can be generated in an operating state in which the scanning path has an angle error, while one or more information tracks are intersected each time per scanning path, which intersections are easily recognizable in the tracking error signal, for example, by a zero crossing. This embodiment is also based on the recognition that the displacement of the location with respect to the start of an information track of corresponding intersections is a measure of the deviation between the nominal transport speed and the actual transport speed.

A further embodiment of the device according to the invention is characterized in that the device is provided with second angle-measuring means for generating a second tilt signal dependent on an angle position of the scanning unit, in which the angle of the scanning paths with respect to the transport direction being dependent on the angle position, and switching means for selecting the second tilt signal as the tilt signal. This has the advantage that the angle position can be checked by selecting the second tilt signal in operating states in which no information tracks can or need to be scanned such as, for example, during fast winding or when a blank record carrier is being written.

A further embodiment of the device according to the invention is characterized in that the second angle-measuring means are provided with an elongate detector which is divided into sub-detectors via a longitudinal axis and a transversal axis, and with means for projecting a radiation spot on the detector by means of a position-measuring beam via the scanning unit for detecting the angle position and a further position of the scanning unit, the position of the radiation spot along the longitudinal axis of the detector being indicative of the angle position. This has the advantage that, irrespective of the actual angle position of the scanning unit, the further position of the scanning unit can be checked on the basis of the position of the scanning spot transverse to the long axis. Due to the elongate shape of the detector, a wide working range is available for the angle position. Those skilled in the art will understand the invention and additional objects and advantages of the invention by studying the description of preferred embodiments below with reference to the following drawings which illustrate every feature of the appended claims:

BRIEF DESCRIPTION OF THE DRAWINGS

In the Figures, elements corresponding to elements already described are denoted by the same reference numerals.

DETAILED DESCRIPTION OF THE PREFERRED EMBODIMENT

Figure 1:
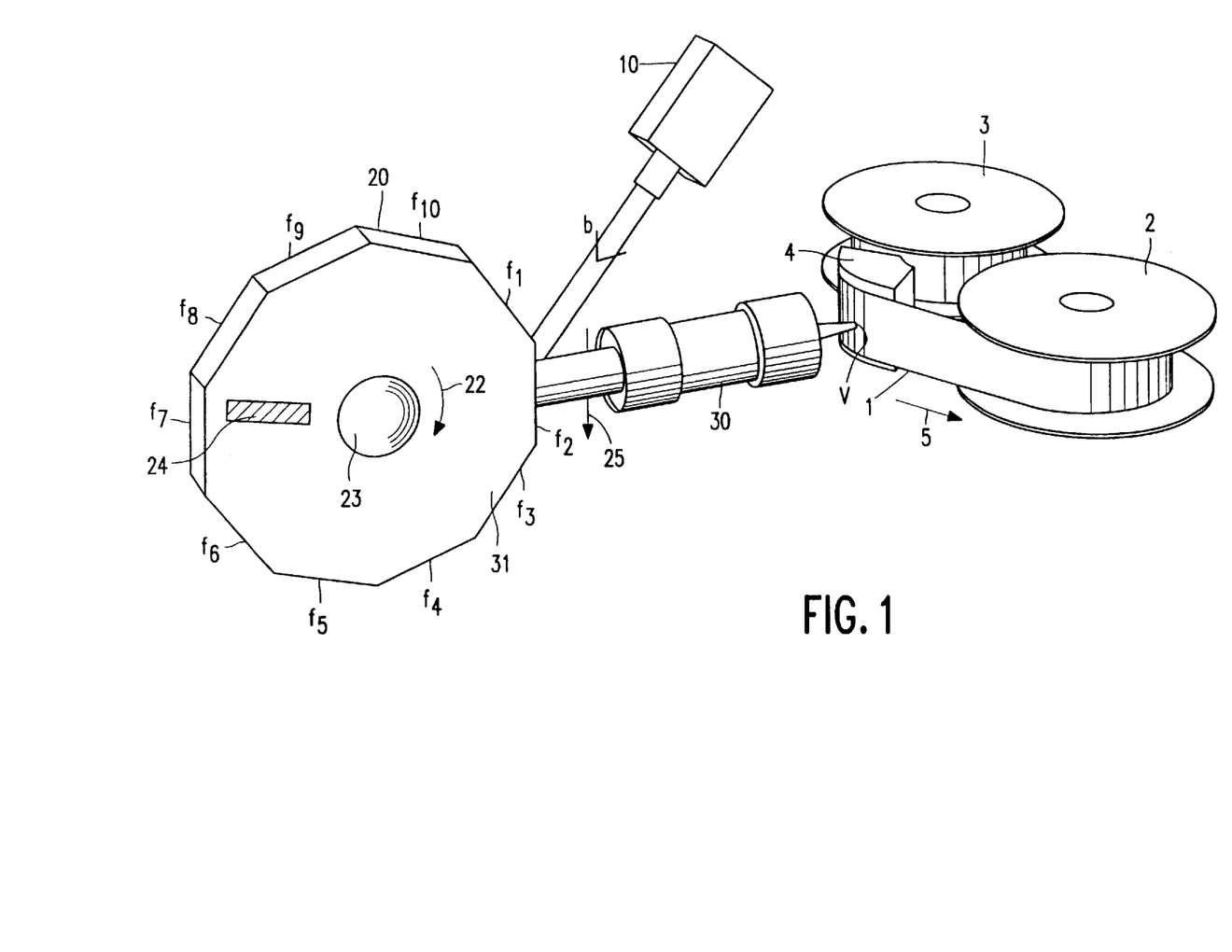
FIG. 1 shows the circuit diagram of an apparatus for scanning an optical tape.

In FIG. 1, the reference numeral 1 denotes a tape-shaped record carrier. This record carrier is directly transported from a supply reel 3 to a take-up reel 2 across a fixed guiding element 4. The apparatus does not need to have any further tape-guiding elements. Both reels are driven by separate motors (not shown). The motors may be driven in such a way that the tape tension remains constant. The transport direction of the tape is denoted by means of the arrow 5.

The scanning means of the apparatus comprise a radiation source detection unit 10 which supplies a scanning beam b, a rotating mirror polygon 20 which reflects the, for example parallel, beam to an objective lens 30 which focuses the beam to a radiation spot V on the tape. The mirror polygon has, for example, ten mirror facets $f_1$–$f_{10}$ which are, for example parallel to the axis of rotation of the mirror polygon. During operation, this polygon rotates in the direction of the arrow 22. Each facet rotating in the radiation path of the beam, facet $f_2$ in the Figure, will then tilt the beam in the direction of the arrow 25 perpendicular to the tape travel direction 5 in the entrance pupil of the objective lens, which entrance pupil is located in the plane of the instantaneously active facet of the mirror polygon. The radiation spot V formed by the objective lens then scans an information track extending in the direction perpendicular to the direction 5. A second, a third, etc. information track are successively scanned with the facets $f_1$, $f_2$, and so forth.

The beam coming from the unit 10 and incident on a mirror facet is located in a plane perpendicular to the axis of rotation of the mirror polygon and extends at an angle of, for example 38° to the center position of the scanning beam which is moved through an angle of, for example 48°. The objective lens, in the form of an f θ has, for example, an effective focal length of 1.25 mm and a numerical aperture of 0.45. The scanning spot can then be moved in the vertical direction, for example through a distance of 1 mm. In this way, it is possible to write and read information tracks having a length of 1 mm in the direction perpendicular to the tape travel direction.

A plurality of horizontal strips of vertical information tracks may be written on a tape. To this end, information tracks with a length of 1 mm are first written from the beginning to the end of the tape. Then, the tape travel direction is reversed, the tape and the optical system are displaced with respect to each other through a distance which is equal to or slightly more than 1 mm and the next horizontal strip of vertical information tracks is written. Thus, 12 strips with information tracks can be provided on a tape having a width of 12.7 mm. The apparatus is also suitable for tapes having different widths, for example a width of 8 mm. Reading a written tape is effected analogously as writing. Then, the beam reflected by the tape travels the same optical path in the reverse direction towards the radiation source detection unit. In this unit, the information signal, a focus error signal and a tracking error signal are obtained in a similar manner as in a player for optical audio discs (CDs). The tracking error signal may be obtained, for example via auxiliary beams, via time and/or phase differences on sub-detectors or via a servopattern with a wobble of a pregroove.

The radiation source detection unit comprises a high-power diode laser having a wavelength of, for example 780 nm. If the objective lens has an NA of 0.45, a resolving power which is comparable to that of the Compact Disc system is obtained. Then, an information density of 1 bit/$\mu$m can be achieved, and a tape having a width of 12.7 mm and a length of 42 m may comprise 50 Gbyte of information.

The information density in the track direction is, for example 0.6 $\mu$m/bit, so that an information track may comprise approximately 1600 bits. The nominal frequency of rotation of the mirror polygon is, for example 2000 revolutions per sec. The scanning frequency of a mirror polygon with ten facets is then 20 kHz. At 1600 bits per information track, an average bitrate of 32 Mbits per second is achieved. The track pitch is of the order of, for example 1.6 $\mu$m. At a scanning frequency of 20 kHz, the tape speed during writing and reading is then 3.2 cm/sec, which is relatively low.

Figure 2:
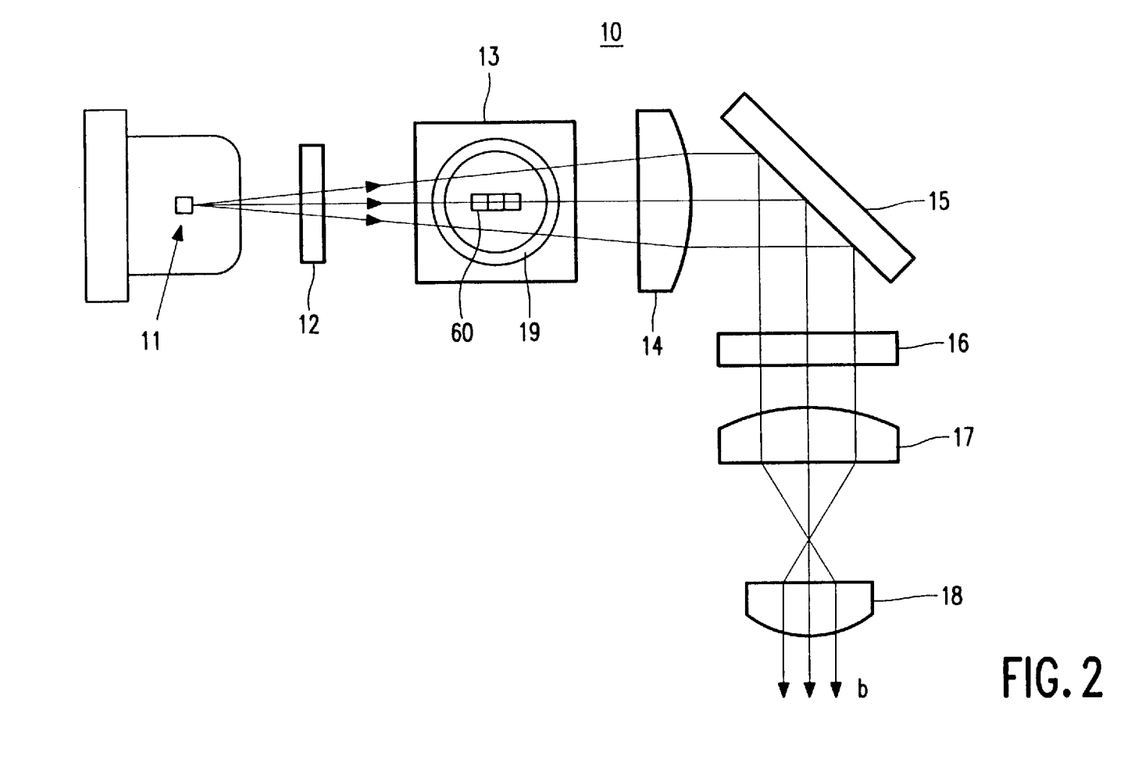
FIG. 2 shows an embodiment of a radiation source detection unit used in this apparatus.

FIG. 2 is a cross-section of an embodiment of the radiation source detection unit 10. This embodiment resembles that which is used in Compact Disc systems. The unit comprises a radiation source 11 in the form of a diode laser supplying a diverging beam. This beam is split up by a diffraction grating 12 into a central main beam, which is used for writing and reading the information, and into two sub-beams (not shown) which are used for generating a tracking error signal. These beams traverse a polarization-sensitive beam splitter 13 and are converted into parallel beams by a collimator lens 14. Via a quarter-wavelength plate 16, the beams leave the radiation source detection unit on their way to the mirror polygon 20 shown in FIG. 1. A folding mirror 15 for reducing the length of the unit may be arranged between the collimator lens 14 and the plate 16. If necessary, a telescopic system consisting of an objective lens 17 and a collimator lens 18 may be arranged behind the plate 16 so as to reduce the diameter of the exiting beam b to a desired value of, for example 1.1 mm. After reflection on the mirror polygon, the beam b and the sub-beams are focused by the objective lens 30 of FIG. 1 on the tape so that a main spot, or scanning spot, V and two sub-spots are produced on this tape.

After passage through the objective lens 30, the beams reflected by the tape are reflected by the mirror polygon towards the unit 10 and traverse this unit in the reverse direction as far as the beam splitter 13. There, the beams are reflected from the path of the on-going beams in a direction perpendicular to the plane of the drawing and reach the radiation-sensitive detection system 60. A cylindrical lens 19 with which notably the main beam can be rendered astigmatic is arranged between the beam splitter 13 and the system 60. This beam is incident on a four-quadrant detector with which the shape of the main spot formed in the detection plane can be determined, which shape is determined by the extent of focusing of the beam on the tape. For tracking, two sub-beams which cooperate with separate detectors are used in this embodiment, because a tracking error signal can be realized therewith, irrespective of the nature of the information bits in the information tracks on a written tape. Since the facets of the mirror polygon are parallel to the axis of rotation of this polygon, the sub-spots move parallel to the path traversed by the main spot. Consequently, the standard three-spot tracking system as used in the Compact Disc systems may be used.

It is to be noted that the radiation source detection unit shown in FIG. 2 is only one of the possible embodiments. This unit may be modified in various manners known from the Compact Disc technology. For example, for the focus detection, the cylindrical lens may be replaced by a roof prism which splits the beam reflected by the tape into two sub-beams each cooperating with a detector pair. The position of each sub-beam with respect to the associated detector pair is then a measure of the focusing. If the information structure is a phase structure, the tracking error signal may not only be generated by using two sub-spots but also from the scanning beam only by splitting the detector for this beam into two parts. The tracking error signal is then obtained by subtracting the signals of the detector parts from each other. This method is known as the push-pull method. The beam splitter 13 may be replaced by a diffraction grating which diffracts the scanning beam reflected by the tape to the detection system. This grating may be divided into two parts or may be astigmatic.

The objective, or scanning, lens 30 may be arranged in an actuator (not shown) so that this lens can be moved in two directions, one movement being used for focus setting and the other being used for tracking. To define an average focus position, the tape transport takes place along the guiding element 4. However, a low-frequency variation of the distance between the tape surface and the lens 30 may still occur, for example due to tape thickness variations. This may be compensated by said first movement with which the distance between the lens and the tape surface can be varied, so that the focal plane of the lens always coincides with the tape surface. This focus control may have very small bandwidths with respect to the scanning frequency. A focus-tilt correction must be performed if the focal plane of the lens 30 is tilted with respect to the tape surface. To this end, the guiding element may be tiltable.

When a blank tape is being written, the objective lens is fixed in a fixed position. The system has a sufficiently high stability to be able to write straight information tracks with an accurate track pitch. Vibrations having a frequency of the order of the scanning frequency do not occur in the system.

When a written tape is being read, unwanted relative movements of the scanning spot and a scanned information track may occur. The first unwanted movement is a movement of the tape in a direction parallel to the information track direction. This movement can be compensated by accurate tape guiding or by controlling the position of the scanning unit in a direction parallel to the track direction. However, it is attractive to compensate for this movement by choosing the scanning path to be longer than the length of the information track. It is thereby ensured that the information track is always within the scanning area. The only effect of this movement is that there will be a small delay in the signal which has been read. The second unwanted movement is caused by small variations of the tape travel speed. These variations may result in an average tracking error. During reading and rewriting of the tape, this error can be compensated by the second movement of the lens made possible by the lens actuator, namely a rotation of the lens about an axis which is parallel to, and preferably situated in, the entrance pupil of this lens. This axis has a direction which is parallel to the track direction. In this way, it is possible to displace the scanning path in a direction perpendicular to the track direction so as to compensate for said tracking error. Therefore, a speed signal is necessary to control this displacement and/or tape travel speed.

The inventors have found that a third unwanted movement is caused by a tilt of the information tracks with respect to the scanning path. This may occur, for example due to deformation of the optical tape or due to differences in guiding the tape along the scanning unit. The actual angle position of the scanning unit which, together with the transport speed and speed of rotation determines the actual angle of the scanning paths, may also deviate from the corresponding position when the tape is being written or produced in another manner. In the known device, an accurate tape guiding and control of the angle position is necessary for this purpose. According to the invention, it is possible to compensate for the tilt by tilting the scanning path in a corresponding manner, which is realized by tilting the mirror polygon in an angular range around the nominal angle position. A tilt signal is necessary for controlling this tilt. Thus, all unwanted deviations of the scanning path with respect to the information tracks due to, inter alia, irregular tape movements can be compensated by active servocontrols, so that a very accurate tape-guiding system operating with microprecision is not necessary. This has the important advantage that the tape transport mechanism may be very simple and allows a very rapid tape transport: the tape is directly transported from one reel to the other on only one guiding element 4.

The mirror polygon is electromagnetically journaled and may move in six degrees of freedom. These movements must be detected so that they can be corrected, if necessary. To this end, a position detection system is provided with which displacements of the mirror polygon along three axes and tilts about two of these axes can be measured. This system also provides the possibility of measuring the rotation of the mirror polygon about its axis of rotation. This system has a simple structure and the available measuring radiation is used efficiently, so that measuring signals of maximum strength are obtained.

Figure 3:
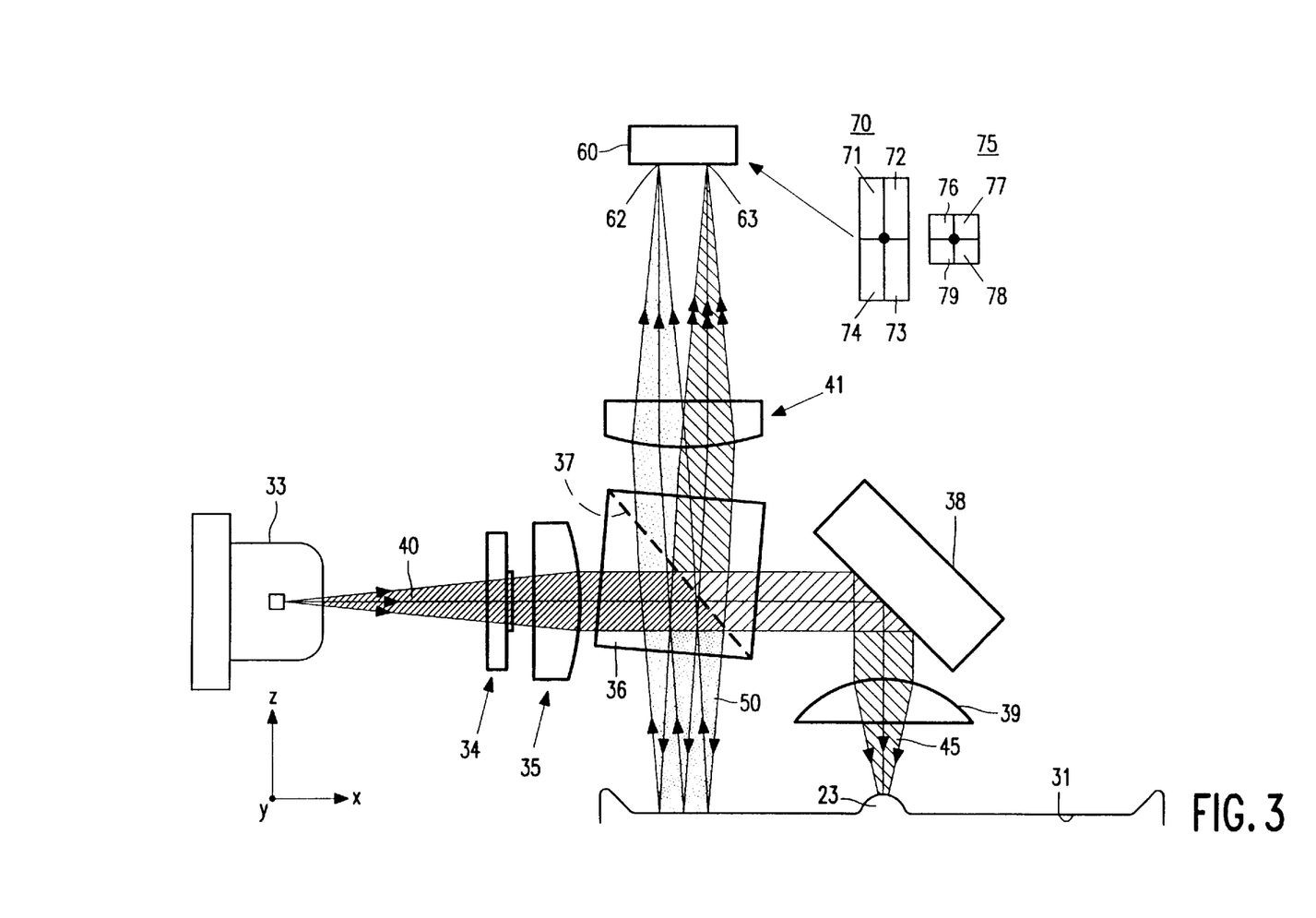
FIG. 3 shows the principle of an optical detection system for detecting the position of the mirror polygon in this apparatus.

FIG. 3 illustrates the principle of the position detection system. The system is provided at the side of the mirror polygon where the spherical element 23, see FIG. 1, is present. In FIG. 3, the reference numeral 33 denotes a diode laser which emits a radiation beam 40. This measuring beam is converted into a parallel beam by a collimator lens 35. Subsequently, this parallel beam is incident on a splitting cube 36 having an interface 37 which reflects a part of this beam as a sub-measuring beam 50 to the polygon. This polygon is denoted by the face 31, the face which is visible in FIG. 1 and is indicated as the reference face in the foregoing. This face is reflective and its center is provided with a semiconvex element 23 which is also shown in FIG. 1 and is also reflective. The reference face 31 may have an area 24 with a different reflection for detecting the speed of rotation. The part of the parallel measuring beam which is not reflected by the splitting cube is passed to a reflector 38 which reflects this part as sub-measuring beam 45 to the spherical element 23 on the reference face 31. This, first, sub-measuring beam is focused by an objective lens 39 in the center of curvature of the spherical element 23. The sub-measuring beam reflected by the element 23 traverses the objective lens 39 and is reflected by the reflector to the beam splitter 36 which reflects a part 45 of the beam to a radiation-sensitive detection system 60 comprising a plurality of detection elements. A lens 41 converting the sub-measuring beam into a converging beam is arranged between the beam splitter and the detection system 60. When the mirror polygon is displaced in the X direction, in the plane of the drawing, and in the Y direction, perpendicular to the plane of the drawing, the radiation spot formed by the first sub-measuring beam in the detection plane is displaced in the X and the Y directions, respectively, with respect to the elements of the detection system 60. This displacement may be measured by combining the output signals of the detection elements in known manner. A cylindrical lens 34 is incorporated in the radiation path for measuring the displacement of the polygon in the Z direction, in the plane of the drawing. This lens converts the diode laser beam into an astigmatic beam. After reflection by the spherical element 23 in the detection plane, such a beam forms a radiation spot whose shape is dependent on the extent to which the beam is focused in the center of curvature of the spherical element 23. When the beam is sharply focused at this point, i.e. when the reference face has the correct position with respect to the position detection system, said radiation spot is substantially circular. When the position of the reference face deviates from the desired position, i.e. when the beam is no longer sharply focused in said center of curvature, said radiation spot has an elliptical shape. The shape of the radiation spot, and hence the Z position of the reference face of the mirror polygon, may be detected in known manner by a four-quadrant detector incorporated in the detection system 60.

Instead of being arranged between the radiation source 33 and the beam splitter 36, the cylindrical lens 34 may be alternatively arranged between the beam splitter and the detection system 60. The neutral beam splitter 36 may also be replaced by the combination of a polarization-sensitive beam splitter and a quarter-wavelength plate. In principle, all radiation from the reference face 31 is then passed to the detection system 60. Instead of a splitting cube which is polarization-sensitive or insensitive, a plane-parallel plate having a separating layer which is either polarization-sensitive or insensitive placed at an angle of 45° to the chief ray of the beam 40 may be used. Such a plate introduces also astigmatism in the beam, so that the cylindrical lens 34 is then no longer required.

The second sub-measuring beam 50 reflected by the beam splitter is incident on a flat portion of the reference face 31. This beam is reflected by the reference face and a portion thereof is passed by the beam splitter to the detection system 60, and also this beam is converged by the lens 41. When the mirror polygon and the reference face 31 are tilted about the X and or Y axis, the radiation spot formed by the second sub-measuring beam in the detection plane is displaced across the detection elements of the system 60 in the X and/or Y direction, so that these tilts can be measured.

In the position detection system described, the first sub-measuring beam 45 is used for detecting displacements along the three axes, X, Y and Z, and the second sub-measuring beam 50 is used for measuring rotations about these three axes. Then, a separate detection system for measuring the relative angle of rotation of the mirror polygon is no longer required.

In order to provide a sufficiently large capturing range for the various measuring signals, the detection elements of the system 60 must have a given size, and the radiation spots 62 and 63 must be sufficiently spaced apart. As is shown in FIG. 3, the beam-separating face 37 is therefore placed obliquely in the radiation path of the measuring beam, i.e. this face extends at an angle different from 45° to the chief ray of the beam 40. It is thereby achieved that the second sub-measuring beam 50 reflected by the beam splitter is incident on the flat portion of the reference face 31 at an angle which differs from 90°. The reflected beam 50 then passes obliquely through the system and the lens 41 focuses this beam in a radiation spot 62 which is located to the left of the system axis. The first sub-measuring beam 45 is perpendicularly incident on the spherical element 23. The reflected beam 45 is now obliquely incident on the separating face 37 of the beam splitter 36 and is thereby deflected to the right so that this beam is also obliquely incident on the lens 41. The radiation spot 63 formed by this beam in the detection plane is then situated to the right of the system axis. The radiation spots 62 and 63 are now so far spaced apart that a sufficiently large capturing range is realized.

The upper part of FIG. 3 shows the detection system 60 in a bottom view. This system comprises two quadrant detectors 70 and 75 with detection elements 71, 72, 73 and 74, and 76, 77, 78 and 79, respectively. If the signals from the detection elements 71, 72, 73 and 74 are represented by a, b, c and d, and those of the detection elements 76, 77, 78 and 79 are represented by p, q, r and s, then the displacements Mx, My and Mz in the X, Y and Z directions, respectively, are given by:

$$Mx=(p+s)-(q+r)$$

$$My=(p+q)-(r+s)$$

$$Mz=(p+r)-(q+s)$$

and the rotations φx, φy and φz about the X, Y and Z axes, respectively, are given by:

$$\phi x=(a+b)-(c+d)$$

$$\phi y=(a+d)-(b+c)$$

$$\phi z=a+b+c+d,$$

the signal φz exhibiting, for example a jump where a strip with a reduced reflection passes underneath the beam 50, or has a substantially sinusoidal variation due to a suitable pattern of reflection reductions.

Instead of being tilted about the Y axis, as is shown in FIG. 3, the beam splitter 36 may also be tilted about the chief ray of the beam 40 so as to achieve that the radiation spots 62 and 63 are sufficiently spaced apart.

The information tracks may be alternatively scanned in a way other than with the mirror polygon described, for example, by periodically deflecting a laser beam or by illuminating and simultaneously imaging a complete information track on a line array with a sufficiently large number of pixels. In any case, the angle between the scanning path and the information track should be as small as possible, for which the tilt signal must be derived. The angle of the scanning path of the line array may be adapted, for example by rotating the line array or by electronically reading the pixels with small time differences. It is to be noted that in a line array the scanning path is produced at least substantially at one instant, but that the further description is based on a variation of time, as is the case with a mirror polygon. The invention is applicable in a device for electromagnetically scanning information tracks on a record carrier in scanning paths. A scanning path is constituted by projecting the electromagnetic radiation, for example a laser beam, onto the record carrier via a mirror polygon as described above. The information tracks are mainly parallel and arranged at a predetermined angle with respect to a transport direction of the record carrier. Short information tracks transverse to the longitudinal direction are used in a tape-shaped record carrier, such as the optical tape described. The device is provided with a scanning unit as shown in, for example FIGS. 1 and 2. The device is also provided with a control system for controlling a scanning path angle with respect to the transport direction, dependent on a tilt signal. The control system comprises, for example actuators for controlling the angle of the scanning unit, such as said electromagnetic bearing of the mirror polygon, allowing the angle position of the mirror polygon to be controlled by means of a suitable control circuit.

The device according to the invention is provided with angle-measuring means for generating the tilt signal dependent on the tracking error signal. This tracking error signal is indicative of a difference between a scanning path and the relevant information track. Information about the position of the information tracks in the transport direction and about the angle between the information track and the scanning path can be derived from the difference, the first yielding a speed signal SP and the second yielding a tilt signal TI. Some embodiments for realizing the signals will hereinafter be described with reference to FIGS. 6, etc.

Figure 4A:
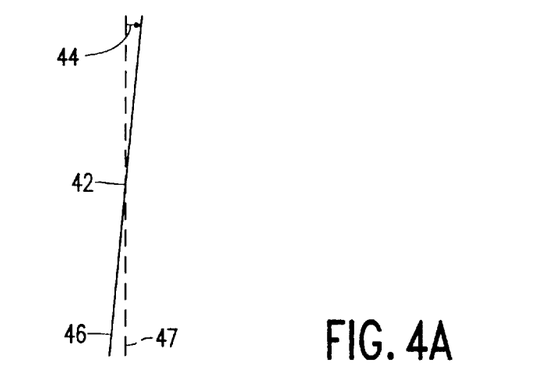
FIG. 4 shows an information track and a scanning path.

FIG. 4a shows an information track 47 and a scanning path 46 constituted by the scanning spot on the record carrier during scanning via one mirror facet. The scanning path 46 has a small angle error 44 with respect to the information track. In this case, the scanning path 46 intersects the information track 47 approximately in the middle at the point of intersection 42.

Figure 5A:
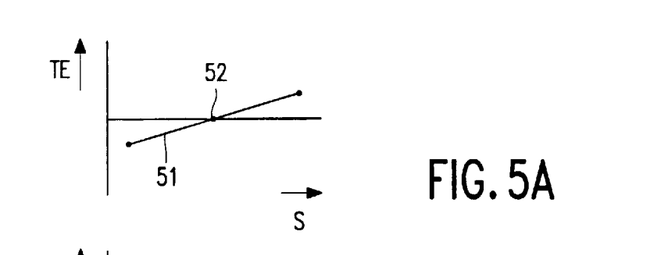
FIG. 5 shows the tracking error signal during scanning.

A graph in FIG. 5a, in which the value of the tracking error signal TE is plotted on the vertical axis and the scanning course S is plotted on the horizontal axis, shows the tracking error signal 51 for the scanning path shown in FIG. 4a. The point of intersection 42 corresponds to the zero crossing 52 of the tracking error signal.

Figure 4B:
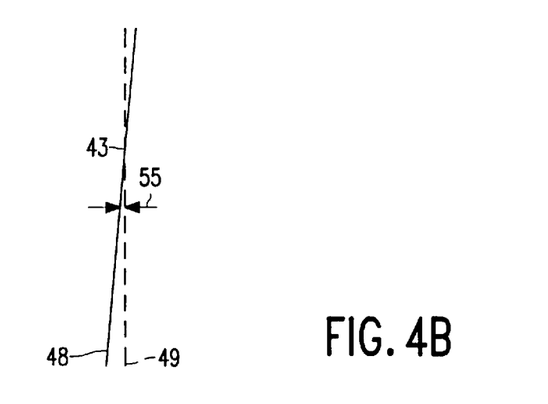

FIG. 4b shows an information track 49 and a scanning path 48. The scanning path 48 again has a small angle error but also a displacement 55 with respect to the center of the information track. In this case, the scanning path 48 intersects the information track 49 asymmetrically at the point of intersection 43.

The graph in FIG. 5b then again shows the tracking error signal 54 for the scanning path shown in FIG. 4b. The point of intersection 43 corresponds to the zero crossing 53 of the tracking error signal.

Figure 5B:
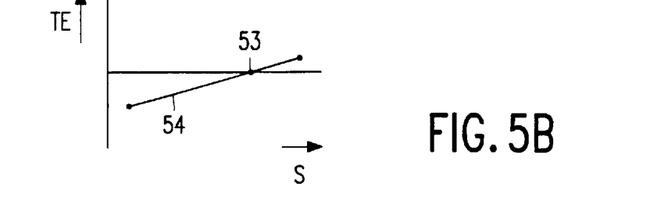
Figure 6:
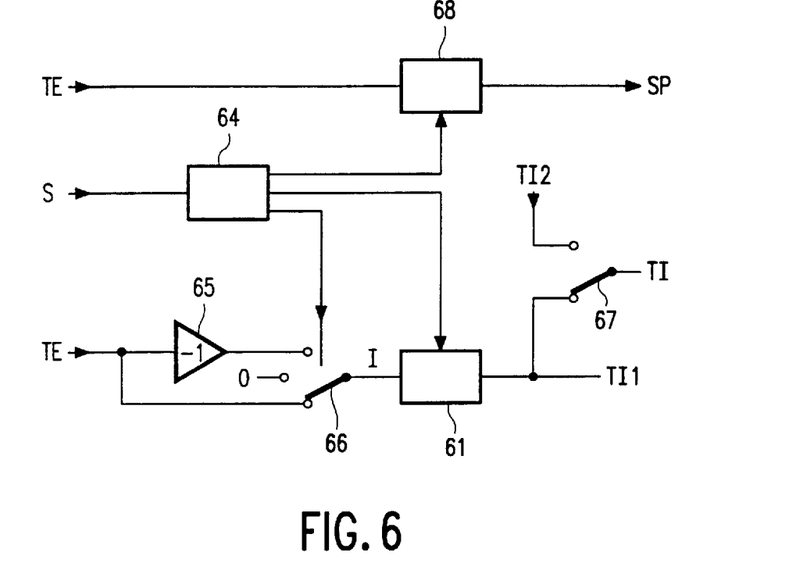
FIG. 6 shows means for generating the tilt signal or a speed signal.

FIG. 6 shows the means for generating the tilt signal TI on the basis of the tracking error signal TE. A first embodiment comprises an integrator 61 for determining the variation of the tracking error signal when an information track is being scanned. The integrator 61 is coupled to a drive unit 64, an input of which receives the scanning signal S indicating the scanning course per scanning path. The input of the integrator 61 is coupled via switching means 66 to the tracking error signal TE or to the inverted value of the tracking error signal TE formed by inverter 65, which switching means are also driven by the drive unit 64. It operates as follows. Before the start of the scanning path, the integrator is set to zero. The start and the instant halfway the scanning path can easily be determined from the scanning signal S, for example from the scanning frequency and synchronizing information derived from the information tracks or from the rotation control signals of the polygon. During the first half of the scanning path, the drive unit 64 will pass on the inverted value of the tracking error signal TE via inverter 65 and switching means 66 to the integrator 61, and during the second half it will pass on the tracking error signal TE. A value I to be integrated, whose integrated value is a measure of the angle error 44, is thereby produced at the input of the integrator 61. At the end of the scanning path, the tilt signal TI1 is then available at the output of the integrator 61. This set-up has the advantage that a possible displacement 55 of the scanning path, as shown in FIG. 5b, does not have any influence on the tilt signal TI1, because the deviation of the tracking error signal in the first half is compensated by the same deviation in the second half. The use of an integrator for the tracking error signal in a maximally large part of the scanning path has the advantage that noise and incidental disturbances due to scratches etc. have little influence on the integrated value. The integrator may of course be provided at the output with a sample-and-hold unit in known manner, so that the tilt signal is available all the time. Alternatively, the tracking error signal may be inverted in the second part of the scanning path and not inverted in the first part, or the signal may be integrated only during a part of the scanning path, for example to prevent peripheral effects at the beginning and end of the scanning path from influencing the tilt signal.

In another embodiment, the tilt signal TI1 may be derived from the tracking error signal by means of a differentiator, which determines the derivative of the tracking error signal at one or more points on a scanning path. A simpler embodiment of the circuit may determine the slope of the tracking error signal from the difference of at least two measuring points on the scanning path. It is then preferred to situate the measuring points at the beginning and end of the scanning path so as to obtain a maximal tilt signal.

In an embodiment of the device, it is desirable to check the angle position in an operational state as well, in which no information tracks are scanned. This is desirable, for example, when the system is being started up, when a blank tape is being written or when scanning is temporarily interrupted and the mirror polygon rotates in a fixed position, for example, during fast winding. To this end, the device is provided with angle-measuring means for generating a second tilt signal dependent on an angle position of the scanning unit. The scanning unit is provided with positioning means such as, for example a measuring system via a position measuring beam, as described with reference to FIG. 3. In this embodiment, the optical configuration is chosen to be such that the rotation of the mirror polygon about the X axis results in a tilt of the scanning path with respect to the transport direction of the record carrier. Moreover, the device is provided with switching means for selecting the second tilt signal as the tilt signal. In a first operational state, the angle position of the mirror polygon about the X axis can be controlled by choosing the signal $\phi x$ as the tilt signal. In a second operational state, the angle position of the mirror polygon about the X axis can be controlled by the tilt signal TI1 on the basis of the tracking error signal TE. This is desirable, for example when prerecorded tape is being read or when a prerecorded tape or a preformatted tape provided with a servopattern consisting of, for example pregrooves or marks at the beginning and/or end of the information tracks is being (re)written. Moreover, it is known from said EP 0 229 395 (hereby incorporated herein in whole by reference) to derive a tilt signal from the tape speed which is determined by means of a speed recording meter (tacho). The tilt signal may also be set to a fixed value for given states of operation, at which the tape speed is fixed or the angle position of the scanning unit must be fixed, as in fast winding. FIG. 6 shows that a second tilt signal TI2 is available from, for example the position measuring means. A system control of a conventional type determines the state of operation on the basis of user commands and controls the switching means 67 for selecting the tilt signal as tilt signal TI1 on the basis of the tracking error signal TE, or the second tilt signal TI2 on the basis of the position measurement.

In an embodiment of the invention provided with a position measuring system as described with reference to FIG. 3, the quadrant detector 70 has an elongate shape, with the long axis extending between the first element 71 and the second element 72. When choosing the position measuring signal as the tilt signal, the rotation signal $\phi x$ can now be derived from the detector quadrants. When choosing the tilt signal on the basis of the tracking error signal, the angle position of the mirror polygon can be varied through a larger range, with the rotation signal $\phi y$ remaining available because the measuring spot is displaced along the long axis in this case. A corresponding implementation is of course alternatively possible, in which the rotation about the Y axis determines the angle of the scanning path. In an elongate quadrant detector, the long axis now extends between the second element 72 and the third element 73. As an alternative to the elongate quadrant detector, a multi-divided detector may be used, in which a plurality of fixed angle positions of the scanning unit can be checked along a corresponding plurality of short sub-axes transverse to the long axis. A second fixed angle position is advantageous, for example, when a blank tape of a different type is being written in a different writing process. When choosing the tilt signal on the basis of the tracking error signal, all detector parts per side of the long axis can then be joined.

A further embodiment of the device is provided with speed-measuring means 68 for generating a speed signal SP which is indicative of the transport speed, dependent on the tracking error signal TE. The speed measuring means 68 comprise a controllable integrator which, in conformity with the integrator 61 for the angle-measuring means, is controlled by a control unit 64 for integrating the tracking error signal TE on a scanning path. In the situation without displacement, as shown in FIG. 4a, the integrated value throughout the scanning path and hence the speed signal SP is zero, whereas for a displacement as shown in FIG. 4b a deviation of the speed results in a speed signal which is unequal to zero. In this embodiment, the speed signal SP is representative of a displacement between the scanning path and the information track and it is therefore possible to minimize this displacement by coupling the speed signal SP to the transport means. The course of the speed signal SP through several scanning paths is representative of the difference between the actual transport speed and a nominal transport speed which is associated with the relevant track pitch and speed of rotation of the mirror polygon. This has been further described with reference to FIGS. 11 to 14. In view of the relatively high speed of rotation of the mirror polygon, it is advantageous to use a fixed value because a change of this speed of rotation will only proceed slowly, or will require extra heavy drive means. It is then advantageous to measure the transport speed of the record carrier with respect to the nominal speed determined by the speed of rotation, the track pitch and the number of facets of the mirror polygon. It is alternatively possible to maintain a twofold, threefold or multifold transport speed by skipping one or more information tracks, when, as it were, a larger track pitch is used. The speed servocontrol is then in a captured state at n times the nominal speed, with the scanned information tracks being scanned completely and the tilt signal being generated on the basis of the tracking error signal, as described hereinbefore for a single transport speed (n=1). In a further embodiment, the speed signal is derived from a measuring point of the tracking error signal or from the sum of several measuring points. The deviation of the transport speed from the nominal speed is then determined from the variation of the measuring values which are situated at corresponding points in subsequent scanning paths.

Figure 7:
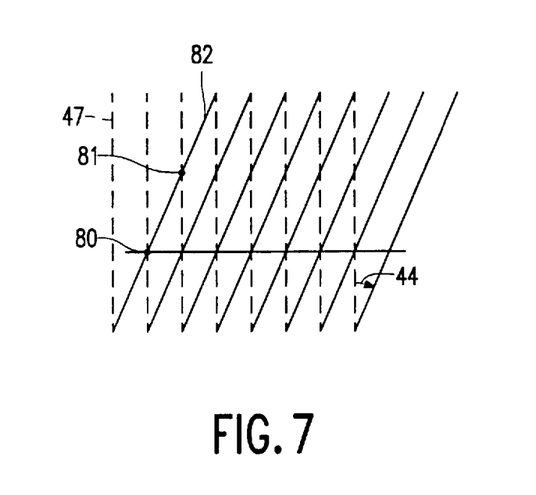
FIG. 7 shows information tracks and scanning paths which intersect a plurality of information tracks.

FIG. 7 shows diagrammatically information tracks and scanning paths intersecting a plurality of information tracks. In this case, a scanning path, denoted by line 82, intersects an information track denoted by a broken line at a first point of intersection 80 and a subsequent information track at a second point of intersection 81. Also in this case, the scanning paths and information tracks have an angle error 44.

Figure 8A:
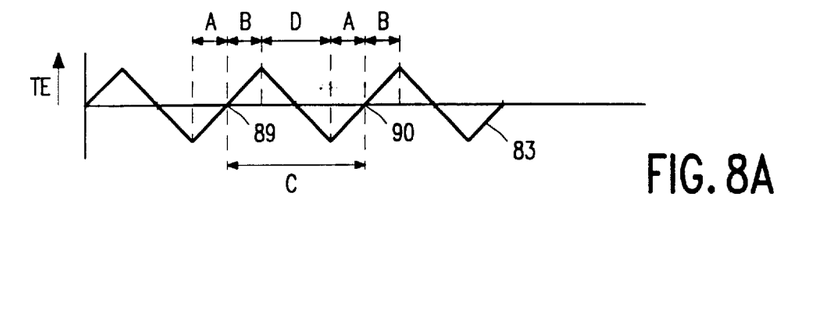
FIG. 8 shows the tracking error signal, the tracking loss signal and the value to be integrated.
Figures 8B, 8C:
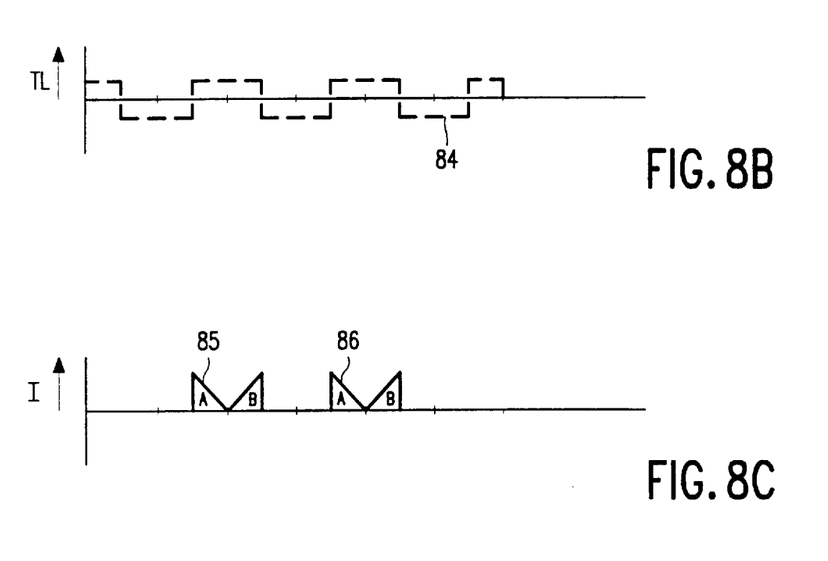

FIG. 8a shows the tracking error signal 83 associated with the scanning path 82. A first part of the tracking error signal preceding a point of intersection upon scanning of an information track is denoted as surface A, a subsequent, second part is denoted as surface B. For determining the tilt signal, the fact should be taken into account that at larger distances to the relevant information track, the tracking error signal no longer has the same relation to this distance. Dependent on the principle chosen for generating the tracking error signal, the relation may change with an increasing tracking error, for example, the slope may be inverted when the distance becomes larger than a quarter of the track pitch, as is shown in area D in FIG. 8a. A tracking loss signal which is indicative of the relation of the tracking error signal and the distance between the scanning path and the relevant information track can be derived from the radiation source detection unit in a conventional manner. FIG. 8b shows the tracking loss signal TL by means of curve 84, in which a negative value indicates that the scanning path is too far remote from an information track. In this area between the information tracks, the slope of the tracking error signal is inverted. Another example of the tracking loss signal is a multi-valent signal indicating that the relation is no longer linear but still has a certain relation to the distance. Generally, the tracking loss signal indicates whether the tracking error signal has a valid relation to the actual distance between the scanning spot and the information track.

In the angle-measuring means described with reference to FIG. 6, a captured state has always been assumed, with a tracking loss signal thus always indicating a valid tracking error signal during a scanning path. In order to generate a reliable tilt signal also in a state in which the tracking error signal is not always valid, only the tracking error signal should be used during a valid part of the scanning path. In this case, the instant of half the valid part is no longer equal to the point halfway the scanning path and therefore cannot be directly derived from the scanning signal S. Now, this instant can be derived from the average length of the valid part. The average length is determined, for example, from the tracking loss signal TL by determining each time the duration from the instant of validity to the instant of invalidity. In view of the relatively large number of scanning paths and intersections with respect to the mechanical time constants of the control system for transport speed and position of the scanning unit, the average length will change only slowly. It is easy to determine half the value from the known average length, for example by means of a two-one divider. Half of this average length is subtracted from the valid part from the beginning, for example by a one-shot or a counter for determining the switching point of the switching means 66. In another embodiment (a valid part of) a scanning path is not only divided into two halves but into a large number of intervals which are divided into two equal parts. A scanning path may be divided into, for example 100 intervals, with the tracking error signal being ignored or integrated in the intervals, dependent on the tracking loss signal. The first half parts of the intervals are each time inverted and the second half parts are directly integrated (or vice versa). Since, within each interval, the signal component in the tracking error signal is cancelled out by the equal signal component in the second half interval due to a displacement in the first half interval, the signal component, due to the angle, is left per interval. The tracking loss signal will indicate an invalid tracking error signal at an arbitrary moment again, with the last interval being broken off and the integration stopping immediately. Since this last interval determines only a small part of the tilt signal, only a small error due to the break-off is then the result. Alternatively, the last interval may be finished, with a tracking error signal which is not (completely) valid then being partly integrated. The integrated value may be read at the end of the scanning path from the integrator without an instant halfway a valid part having to be determined. Moreover, valid parts, which are not complete, as at the beginning or the end of the information track, can largely be incorporated in the tilt signal via the intervals.

Figure 9:
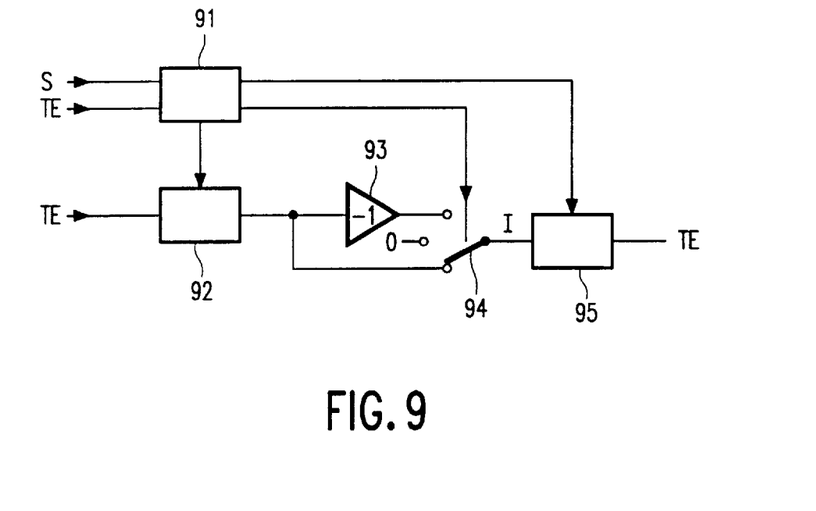
FIGS. 9 and 10 show means for generating the tilt signal via a memory.

FIG. 9 shows another embodiment of the angle-measuring means. The tracking error signal TE is coupled to a memory 92 and the output of the memory 92 is coupled, if necessary via inverter 93, via switching means 94 to integrator 95 which generates the tilt signal TI at the output. The tracking loss signal TL and the scanning signal S are coupled to the control unit 91 with which it controls the integrator 95 and switching means 94 in such a way that part of the scanning path at which the tracking loss signal indicates that the tracking error signal TE is valid is integrated. FIG. 8a shows this part with the surfaces A and B to be integrated. At an invalid tracking error signal, the switching means 94 are brought to a third state at which the input of integrator 95 does not receive a signal. FIG. 8c shows the signal I to be integrated for the case where a first curve 85 relates to the area around the first intersection 80 resulting in a zero crossing 89, and a second curve 86 relates to the area around the second intersection 81 resulting in zero crossing 90. Also in the non-captured state now shown, the tilt signal is generated in conformity with the angle error because the surfaces A and B are integrated around one or more intersections. A value of the tilt signal per intersection can be supplied in this case, or the signal of the joint different sections may be integrated. Also in this case, the tilt signal is derived on the basis of the tracking error signal, independent of the transport speed of the record carrier, because it is true that a number of information tracks is then intersected but the tilt signal is generated per intersection. It is to be noted that the tilt signal becomes available with a given delay because the tracking error signal is first stored in the memory 92. When the signal from the memory 92 is processed, the control unit 91 already knows the course of the tracking loss signal TL and the scanning signal S from which it determines the instant halfway a valid part of a scanning path and also determines whether the tracking error signal around an intersection is completely available. The tracking error signal at partial intersections, as at the beginning and end of the scanning path, is not passed on to the input of the integrator 95 because this would yield an erroneous tilt signal upon integration.

Figure 8D:
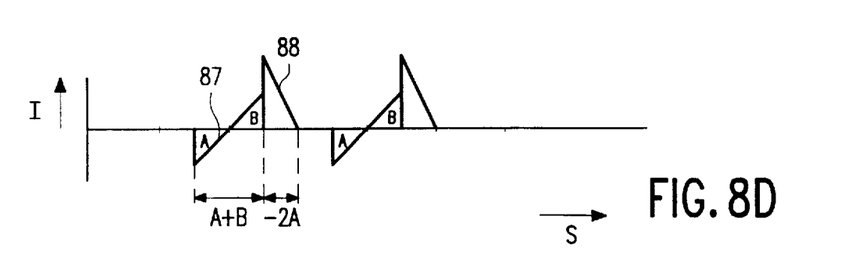
Figure 10:
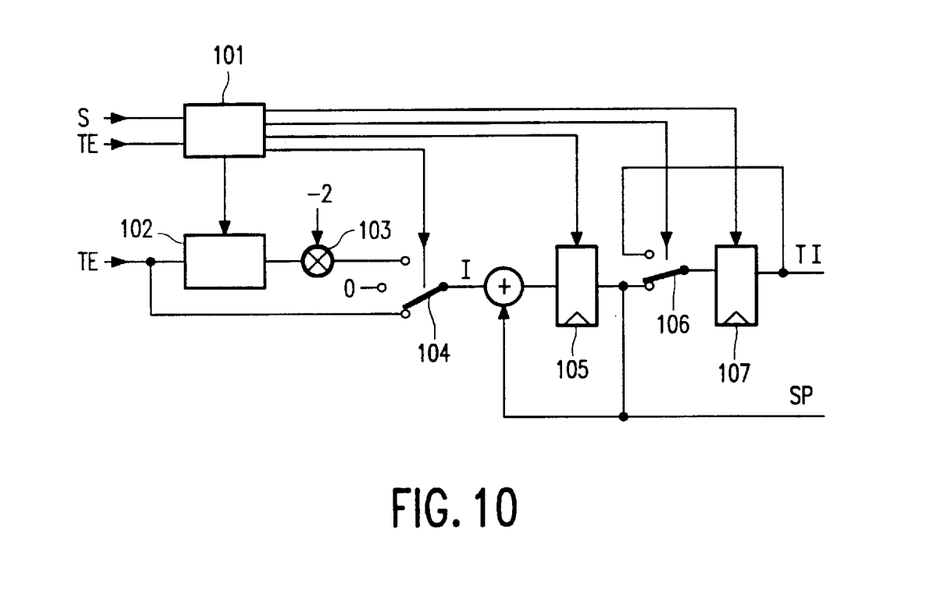

FIG. 10 shows a further embodiment of the angle-measuring means. The tracking error signal TE is coupled to a memory 102 and the output of the memory 102 is coupled, if necessary, via twice-inverting amplifier 103, via switching means 104 to integrator 105 which is implemented in this case as a register whose input is coupled via an adder adding the combined value at the output to the new value. The output of the integrator 105 is coupled to a sample-and-hold unit which is implemented in this case as a register 107 which either retains the existing contents via switching means 106 or takes over a new value at the input and generates the tilt signal TI at the output. The tracking loss signal TL and scanning signal S are coupled to the control unit 101 which controls the memory 102, the switching means 104, the integrator and the sample-and-hold unit. In the case of an invalid tracking error signal, switching means 104 are brought to a third state in which the input of the integrator 105 does not receive a signal. The operation is shown as follows for a non-captured state in FIG. 8d. At the start of the scanning path, the integrator 105 is set to zero. During scanning, a part of the scanning path may be considered to be a valid part with a valid tracking error signal TE indicated by the tracking loss signal TL and the scanning signal S, during which part the tracking error signal TE is applied to the input of the integrator via switching means 104. In FIG. 8d, the surface A+B to be integrated is denoted by the curve 87. At the end of the valid part of the scanning path, the length of this valid part is known and hence the point at which half of this part is situated is known. The first half of the relevant valid tracking error signal can now be applied from the memory via the twice-inverting amplifier 103 to the input of the integrator, as is shown as surface −2A in FIG. 8d with curve 88. In a digital system, this addition of the surface −2A may be easily performed in a faster manner. Subsequently, the sample-and-hold unit takes over the value of the integrator as the tilt signal. Consequently, the tilt signal becomes available with only a limited delay. Also in a non-captured state, the integrator may combine the tracking error signal around several intersections. In a captured state, in which the entire scanning path yields a valid tracking error signal of the relevant information track, the speed signal SP is available at the end of the valid tracking error signal as described with reference to FIG. 6. This signal can be taken over at that instant by means of a second sample-and-hold unit (not shown). This embodiment has the advantage that only one integrator is required.

Another embodiment of the angle-measuring means is provided with means for generating the tilt signal on the basis of the time elapsing between two intersections, as is indicated by the intersection interval C in FIG. 8a. In this case, the time or the relative distance with respect to an entire scanning path between two zero crossings of the tracking error signal is determined. It is to be noted that in this case the tilt signal is also dependent on the transport speed which should thus be controlled in a different manner. Conversely, the transport speed can be determined from the intersection interval C if the track pitch, the angle position and the scanning speed of the scanning unit are known.

Figure 11A:
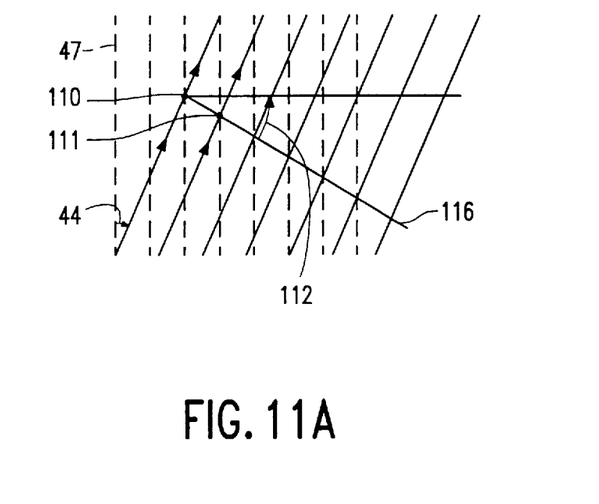
FIG. 11 shows corresponding intersections of different scanning paths with information tracks at a positive angle error and at too high and too low transport speeds.
Figure 11B:
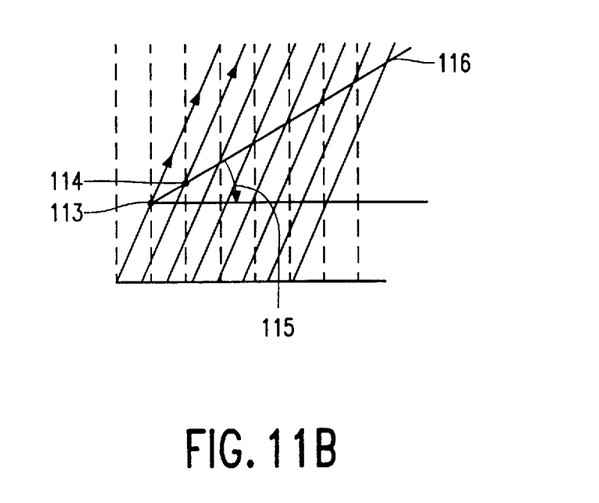
Figure 12A:
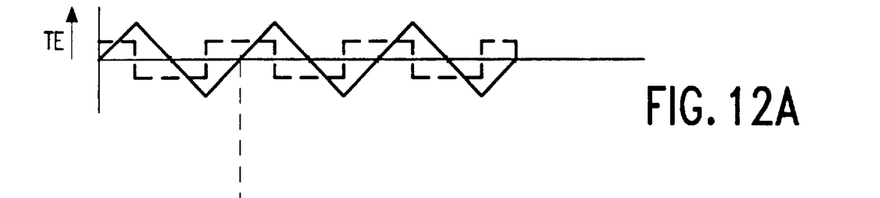
FIG. 12 shows the tracking error signal and the phase difference of successive scanning paths.
Figure 12B:
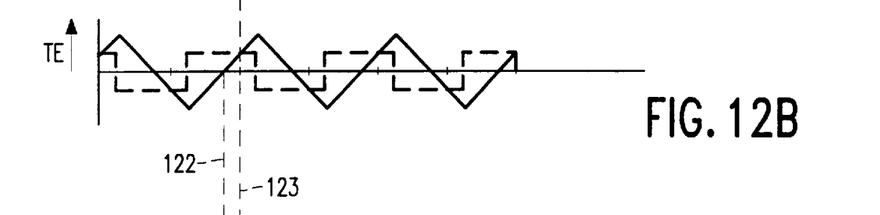
Figure 12C:
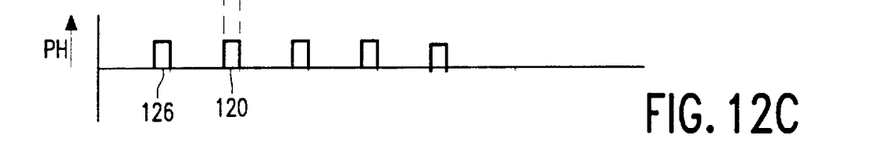
Figure 12D:
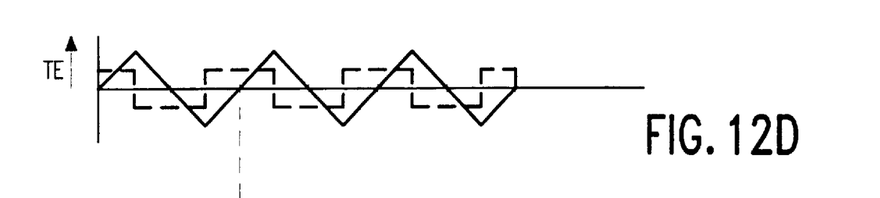
Figure 12E:
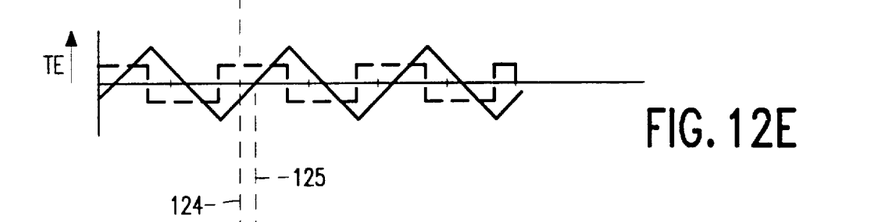
Figure 12F:
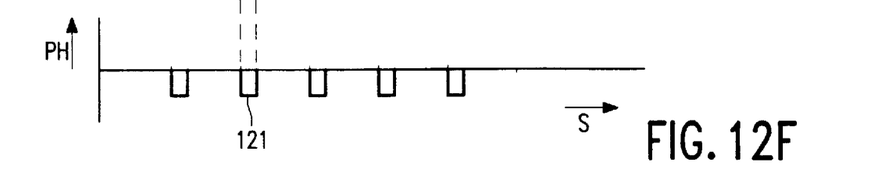

FIG. 11a shows corresponding intersections 110, 111 of different scanning paths with information tracks in a non-captured state at a positive angle error 44 and at a too high transport speed. At a too high transport speed, the intersections occur at increasingly earlier instants with respect to the start of the scanning path. A line 116 through the intersections constitutes a positive phase angle 112 to the transport direction, which phase angle 112 is proportional to the speed difference between the transport speed and the nominal speed for the given mirror polygon and its speed of rotation. FIGS. 12a and 12b show the tracking error signal TE and the tracking loss signal TL of a first and a second scanning path. By determining the average value or by means of a pulse/pause ratio, a speed signal can be derived in a simple manner from the phase difference signal PH, indicated as pulse 120 in FIG. 12c, via the lines 122 and 123 for the course between the points of intersection 110 and 111. A positive value then indicates a positive speed difference of the transport speed with respect to the nominal speed. It is to be noted that also the phase difference around the zero crossing of the tracking error signal halfway between the information tracks yields a pulse 126 in the phase difference signal PH.

FIGS. 11b and 12c, 12d and 12e show corresponding intersections 113, 114 at a too low transport speed, with the associated signals. As is apparent from the lines 124 and 125, the pulse 121 in the phase difference signal PH is now negative, which indicates a negative speed difference. It is to be noted that the phase difference is dependent on the angle error 44; a smaller angle error yields a larger phase difference signal. In a substantially captured state, in which there is only one intersection per scanning path, the situation has already been described with reference to FIGS. 4b and 5b.

Figure 13A:
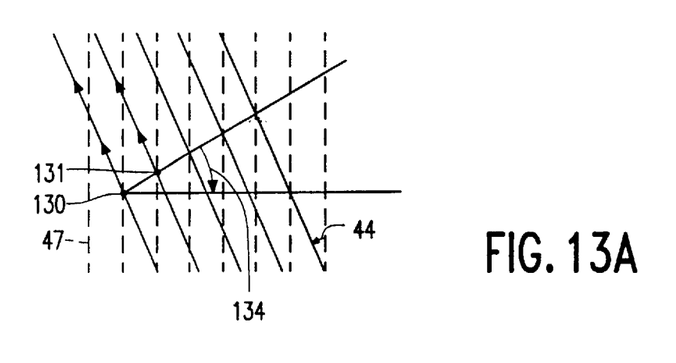
FIG. 13 shows corresponding intersections of different scanning paths with information tracks at a negative angle error and at too high and too low transport speeds.
Figure 13B:
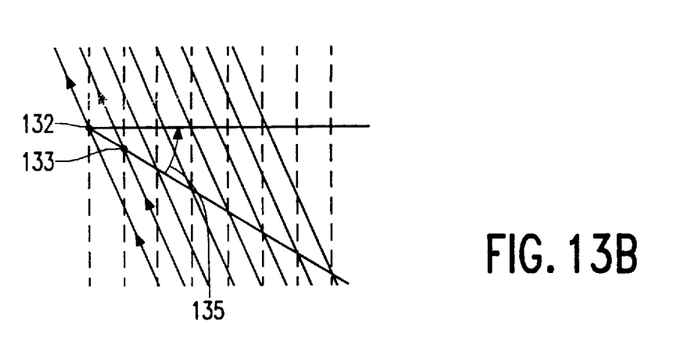

FIGS. 13a and 13b show corresponding intersections 130, 131 and 132, 133 of different scanning paths with information tracks at a negative angle error 44 and at a too high transport speed, indicated by a negative phase angle 134, and at a too low transport speed, indicated by a positive phase angle 135. These Figures show that the phase angle and the phase difference signals are inverted at a negative angle error 44.

Figure 14:
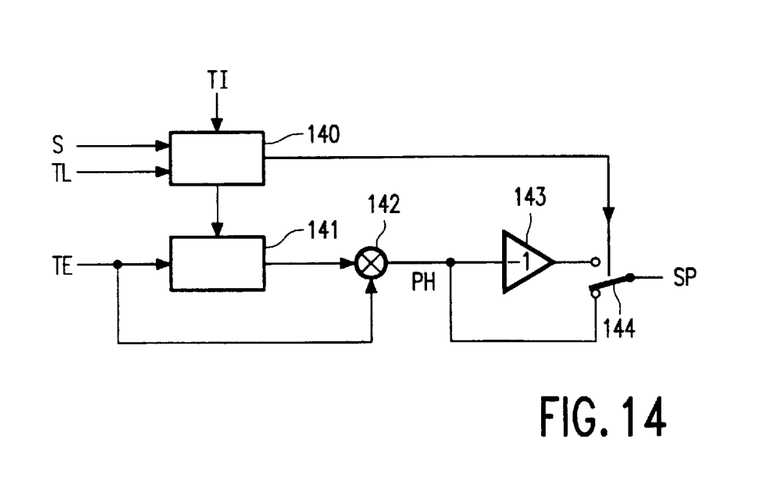
FIG. 14 shows means for generating the speed signal.

FIG. 14 shows means for generating the speed signal on the basis of several corresponding intersections, as described hereinbefore with reference to FIGS. 11, 12 and 13. The tracking error signal TE is coupled to the input of a memory 141 and to a phase comparator 142. The output of the memory 141 supplies the tracking error signal of the previous scanning path to the phase comparator 142. The output of the phase comparator 142 then supplies the phase difference signal PH which is applied as the speed signal SP to the output either directly or via the inverter 143 and switching means 144. The control unit 140 receives the tracking loss signal TL, the scanning signal S and the tilt signal TI with which it controls the memory 141 for storing per scanning path, and the switching means 144 for passing on the inverted phase difference signal PH at a negative tilt signal TI.

It is to be noted that the scanning signal S and the tracking loss signal TL in the relevant embodiments can be combined to one signal having a value which, during a scanning path, is equal to the tracking loss signal and indicates an invalid tracking error signal always during a given period when there is a change-over from one scanning path to a subsequent scanning path.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

We claim:

1. A device for electromagnetically scanning information tracks in scanning paths on a record carrier, which information tracks are arranged mainly parallel to each other and at a predetermined angle with respect to a transport direction of the record carrier, the device comprising: a scanning unit for scanning; and a control system for controlling an angle of the scanning paths with respect to the transport direction, dependent on a tilt signal, wherein the device includes angle-measuring means for generating the tilt signal dependent on a tracking error signal which is indicative of a difference between a scanning path and the relevant information track.

2. The device for scanning information tracks as claimed in claim 1, wherein the angle-measuring means are adapted to generate the tilt signal dependent on a change of the tracking error signal when an information track is being scanned.

3. The device for scanning information tracks as claimed in claim 2, wherein the angle-measuring means include means to generate the tilt signal dependent on a difference between an integrated value of the tracking error signal when a first part and a second part of the relevant information track are being scanned.

4. The device for scanning information tracks as claimed in claim 1, wherein the angle-measuring means include means to generate the tilt signal dependent on the tracking error signal and a tracking loss signal which is indicative of a relation between the tracking error signal and the distance between the scanning path and the relevant information track.

5. The device for scanning information tracks as claimed in claim 1, wherein the angle-measuring means include means to generate the tilt signal dependent on the location of the points of intersection of the scanning path with different information tracks.

6. The device for scanning information tracks as claimed in claim 1, further comprising speed-measuring means for generating a speed signal which is indicative of the transport speed dependent on the tracking error signal.

7. The device for scanning information tracks as claimed in claim 6, wherein the speed-measuring means include means to generate the speed signal dependent on an integrated value of the tracking error signal when the relevant information track is being scanned.

8. The device for scanning information tracks as claimed in claim 6, wherein the speed-measuring means include means to generate the speed signal dependent on the location of corresponding points of intersection of different scanning paths with information tracks.

9. The device for scanning information tracks as claimed in claim 1, further comprising second angle-measuring means for generating a second tilt signal dependent on an angle position of the scanning unit, in which the angle of the scanning paths with respect to the transport direction being dependent on the angle position, and switching means for selecting the second tilt signal as the tilt signal.

10. The device for scanning information tracks as claimed in claim 9, wherein the second angle-measuring means include an elongate detector which is divided into sub-detectors via a longitudinal axis and a transversal axis; and means for projecting a radiation spot on the detector by means of a position-measuring beam via the scanning unit for detecting the angle position and a further position of the scanning unit, the position of the radiation spot along the longitudinal axis of the detector being indicative of the angle position.

* * * * *